United States Patent
Fu et al.

(10) Patent No.: US 12,408,046 B2
(45) Date of Patent: Sep. 2, 2025

(54) RESOURCE INDICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhe Fu, Guangdong (CN); Jing Xu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 351 days.

(21) Appl. No.: 17/654,540

(22) Filed: Mar. 11, 2022

(65) Prior Publication Data
US 2022/0201506 A1    Jun. 23, 2022

Related U.S. Application Data

(63) Continuation of application No. PCT/CN2020/078313, filed on Mar. 6, 2020.

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0053* (2013.01); *H04L 5/0094* (2013.01);
(Continued)

(58) Field of Classification Search
CPC ... H04W 16/28; H04W 72/046; H04W 72/21; H04W 80/02; H04W 72/044;
(Continued)

(56) References Cited

U.S. PATENT DOCUMENTS

| 2019/0230730 A1 | 7/2019 | Wang et al. |
| 2019/0268961 A1 | 8/2019 | Tsai et al. |

(Continued)

FOREIGN PATENT DOCUMENTS

| CN | 106063349 A | 10/2016 |
| CN | 110167126 A | 8/2019 |
| WO | 2020042981 A1 | 3/2020 |

OTHER PUBLICATIONS

Zhou, U.S. Appl. No. 62/825,587, filed Mar. 28, 2019 (Year: 2019).*

(Continued)

*Primary Examiner* — Jay L Vogel
(74) *Attorney, Agent, or Firm* — PERKINS COIE LLP (57) ABSTRACT

The present application relates to a resource indication method, a terminal device, and a network device, the resource indication method comprising: a terminal device receives first indication information, which is used for indicating spatial relationship information corresponding to one or more physical uplink control channel configurations (PUCCH-configs); and the terminal device determines, according to the first indication information, at least one PUCCH-config corresponding to the spatial relationship information from among multiple PUCCH-configs. By using the embodiments of the present application, accurate resource indication can be implemented.

4 Claims, 5 Drawing Sheets

S101
A terminal device receives first indication information, the first indication information being used for indicating spatial relation information corresponding to one or more Physical Uplink Control Channel configurations (PUCCH-configs)

S102
The terminal device determines at least one PUCCH-config, which corresponds to the spatial relation information, from multiple PUCCH-configs according to the first indication information (51) Int. Cl.
  *H04W 72/044* (2023.01)
  *H04W 72/0457* (2023.01)
  *H04W 72/21* (2023.01)
  *H04W 72/231* (2023.01)
  *H04W 80/02* (2009.01)

(52) U.S. Cl.
  CPC ..... *H04W 72/044* (2013.01); *H04W 72/0457* (2023.01); *H04W 72/046* (2013.01); *H04W 72/21* (2023.01); *H04W 72/231* (2023.01); *H04L 5/0098* (2013.01); *H04W 80/02* (2013.01)

(58) Field of Classification Search
  CPC .................. H04W 72/0453; H04W 72/23; H04L 5/0053; H04L 5/0098; H04L 5/0094
  See application file for complete search history.

(56) References Cited

U.S. PATENT DOCUMENTS

| | | | | |
|---|---|---|---|---|
| 2019/0335524 | A1 | 10/2019 | Wang et al. | |
| 2020/0053721 | A1* | 2/2020 | Cheng | H04B 7/0408 |
| 2020/0305007 | A1* | 9/2020 | Chen | H04B 7/0404 |
| 2020/0314664 | A1* | 10/2020 | Zhou | H04L 5/0023 |
| 2021/0212055 | A1* | 7/2021 | Lin | H04L 5/0055 |
| 2022/0337382 | A1* | 10/2022 | Zheng | H04L 5/0096 |
| 2022/0393840 | A1* | 12/2022 | Määttanen | H04L 5/001 |
| 2023/0077264 | A1* | 3/2023 | Gao | H04L 5/0098 |

OTHER PUBLICATIONS

U.S. Appl. No. 62/958,164, filed Jan. 1, 2020 (Year: 2020).*
3GPP "Medium Access Control (MAC) protocol specification (Release 15)" 3GPP TS 38.321 V15.7.0 (Sep. 2019). 77 pages.
Panasonic "On PUSCH enhancements for NR URLLC" R1-1908939; 3GPP TSG RAN WG1 #98; Prague, CZ; Aug. 26-30, 2019. 8 pages.
Examination report for European application No. 20923464.0 issued Oct. 12, 2023, 5 Pages.
Examination Report for European Application No. 20923464.0 issued May 22, 2023. 6 pages.
First Office Action of Chinese application No. 202210477741.3 issued on Jun. 2, 2023. 13 pages with English translation.
3GPP TS 38.212 V16.0.0 (Dec. 2019)—3rd Generation Partnership Project; Technical Specification Group Radio Access Network; NR; Multiplexing and channel coding (Release 16) (141 pages).
3GPP TS 38.213 V16.0.0 (Dec. 2019)—3rd Generation Partnership Project; Technical Specification Group Radio Access Network; NR; Physical layer procedures for control (Release 16) (145 pages).
3GPP TS 38.321 V16.5.0 (Jun. 2021)—3rd Generation Partnership Project; Technical Specification Group Radio Access Network; NR; Medium Access Control (MAC) protocol specification (Release 16) (156 pages).
3GPP TS 38.331 V16.5.0 (Jun. 2021)—3rd Generation Partnership Project; Technical Specification Group Radio Access Network; NR; Radio Resource Control (RRC) protocol specification (Release 16) (956 pages).
3GPP TSG RAN WG1 Meeting #96bis—R1-1904209—Xi'an, China, Apr. 8-12, 2019—LG Electronics, Discussion on multi-beam based operations and enhancements (13 pages).
3GPP TSG RAN WG1 Meeting #96bis—R1-1905838—Xi'an, China, Apr. 8-12, 2019—LG Electronics, Updated feature lead summary of Enhancements on Multi-beam Operations (24 pages).
International Search Report issued Nov. 6, 2020 of PCT/CN2020/078313 (4 pages).
Asia Pacific Telecom "UCI enhancements" R1-2000775; 3GPP TSG-RAN WG1 #100 e-Meeting; Feb. 24-Mar. 6, 2020. 5 pages.
Ericsson "On MAC CE design for eURLLC" R2-2000799; 3GPP TSG RAN WG2 #109-e; Electronic Meeting; Feb. 24-Mar. 6, 2020. 11 pages.
Examination Report for Indian Application No. 202217016182 issued Oct. 12, 2022. 7 pages with English translation.
Extended European Search Report for European Application No. 20923464.0 issued Sep. 20, 2022. 8 pages.

* cited by examiner

FIG. 1

| R | Serving Cell ID | BWP ID |
|---|---|---|
| R | PUCCH Resource ID | |
| $S_7$ | $S_6$ $S_5$ $S_4$ $S_3$ $S_2$ $S_1$ | $S_0$ |

A network device sends first indication information to a terminal device, the first indication information being used for indicating spatial relation information corresponding to one or more PUCCH-configs

FIG. 4

| R | Serving Cell ID | | | | | BWP ID |
|---|---|---|---|---|---|---|
| $P_i$ | PUCCH Resource ID | | | | | |
| $S_7$ | $S_6$ | $S_5$ | $S_4$ | $S_3$ | $S_2$ | $S_1$ | $S_0$ |
| $P_i$ | PUCCH Resource ID | | | | | |
| $S_7$ | $S_6$ | $S_5$ | $S_4$ | $S_3$ | $S_2$ | $S_1$ | $S_0$ |

⋮

| $P_i$ | PUCCH Resource ID | | | | | |
|---|---|---|---|---|---|---|
| $S_7$ | $S_6$ | $S_5$ | $S_4$ | $S_3$ | $S_2$ | $S_1$ | $S_0$ |

FIG. 5

| R | Serving Cell ID | | | | | BWP ID | |
|---|---|---|---|---|---|---|---|
| R | PUCCH Resource ID | | | | | | |
| S₇ | S₆ | S₅ | S₄ | S₃ | S₂ | S₁ | S₀ |
| R | PUCCH Resource ID | | | | | | |
| S₇ | S₆ | S₅ | S₄ | S₃ | S₂ | S₁ | S₀ |

| R | PUCCH Resource ID | | | | | | |
|---|---|---|---|---|---|---|---|
| S₇ | S₆ | S₅ | S₄ | S₃ | S₂ | S₁ | S₀ |

FIG. 6

| R | Serving Cell ID | | | | | BWP ID | |
|---|---|---|---|---|---|---|---|
| P₇ | P₆ | P₅ | P₄ | P₃ | P₂ | P₁ | P₀ |
| R | PUCCH Resource ID | | | | | | |
| S₇ | S₆ | S₅ | S₄ | S₃ | S₂ | S₁ | S₀ |
| R | PUCCH Resource ID | | | | | | |
| S₇ | S₆ | S₅ | S₄ | S₃ | S₂ | S₁ | S₀ |

FIG. 7

| R | Serving Cell ID | | | | | BWP ID | |
|---|---|---|---|---|---|---|---|
| P | PUCCH Resource ID | | | | | | |
| $S_7$ | $S_6$ | $S_5$ | $S_4$ | $S_3$ | $S_2$ | $S_1$ | $S_0$ |

RESOURCE INDICATION METHOD, TERMINAL DEVICE, AND NETWORK DEVICE

CROSS-REFERENCE TO RELATED APPLICATION

The present application is a continuation application of International PCT Application No. PCT/CN2020/078313, filed on Mar. 6, 2020, the entire content of which is hereby incorporated by reference.

TECHNICAL FIELD

The present application relates to the field of communication, and more particularly, to a resource indication method, a terminal device and a network device.

BACKGROUND

Requirements of the 5th-generation (5G) wireless communication technology include three application scenarios: Enhanced Mobile Broadband (eMBB), Massive Machine Type Communication (mMTC) and Ultra-Reliable and Low Latency Communications (URLLC). Further, requirements of the Industrial Internet of Things (IIoT) include supporting transmission of services, such as Factory Automation, Transport Industry, or Electrical Power Distribution, in a 5G system.

Correspondingly, the IIoT system may support transmission of a URLLC service and an eMBB service, and in order to support various services, sometimes, it is needed to configure with a plurality of sets of resources for a terminal device. Compared with a case of only configuring with one set of resources in the past, how to accurately indicate information of the plurality of sets of resources is a problem to be solved at present.

SUMMARY

In view of the above, embodiments of the present application provides a resource indication method, a terminal device and a network device, which can accurately indicate a plurality of sets of resource information.

In an embodiment of the present application, a resource indication method that is applied to a terminal device is provided, which includes: receiving, by a terminal device, first indication information, wherein the first indication information is used for indicating spatial relation information corresponding to one or more Physical Uplink Control Channel configurations (PUCCH-configs); and determining, by the terminal device, at least one PUCCH-config, which corresponds to the spatial relation information, from a plurality of PUCCH-configs according to the first indication information.

In an embodiment of the present application, a resource indication method that is applied to a network device is provided, which includes: sending, by a network device, first indication information to a terminal device, wherein the first indication information is used for indicating spatial relation information corresponding to one or more Physical Uplink Control Channel configurations (PUCCH-configs).

In an embodiment of the present application, a terminal device is further provided, which includes: a receiving module configured to receive first indication information, wherein the first indication information is used for indicating spatial relation information corresponding to one or more Physical Uplink Control Channel configurations (PUCCH-configs); and a determining module configured to determine at least one PUCCH-config, which corresponds to the spatial relation information, from a plurality of PUCCH-configs according to the first indication information.

In an embodiment of the present application, a network device is further provided, which includes: a sending module configured to send first indication information to a terminal device, wherein the first indication information is used for indicating spatial relation information corresponding to one or more Physical Uplink Control Channel configurations (PUCCH-configs).

In an embodiment of the present application, a terminal device is further provided, which includes: a processor and a memory, wherein the memory is configured to store a computer program; and the processor invokes and runs the computer program stored in the memory to implement the above-mentioned resource indication method.

In an embodiment of the present application, a network device is further provided, which includes: a processor and a memory, wherein the memory is configured to store a computer program; and the processor is configured to invoke and run the computer program from the memory to implement the above-mentioned resource indication method.

In an embodiment of the present application, a chip is further provided, which includes a processor, configured to invoke and run a computer program from a memory to enable a device having the chip installed therein to implement the above-mentioned resource indication method.

In an embodiment of the present application, a computer readable storage medium is further provided, which is configured to store a computer program, wherein the computer program enables a computer to implement the above-mentioned resource indication method.

In an embodiment of the present application, a computer program product is further provided, which includes computer program instructions that enable a computer to implement the above-mentioned resource indication method.

In an embodiment of the present application, a computer program is further provided, which enables a computer to implement the above-mentioned resource indication method.

According to the embodiment of the invention, the terminal device can distinguish the PUCCH configurations corresponding to the spatial relation information according to the first indication information, and can clearly indicate the PUCCH configurations corresponding to the spatial relation information when there are a plurality of PUCCH configurations configured, so as to eliminate possible understanding ambiguity between the terminal device and the network device.

DETAILED DESCRIPTION

Technical solutions according to embodiments of the present application will be described below with reference to drawings of the embodiments of the present application.

Technical solutions according to embodiments of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunications System (UMTS), Wireless Local Area Networks (WLAN), Wireless Fidelity (WiFi), a 5th-generation (5G) communication system, or another communication system, etc.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the embodiments of the present application may be applied to these communication systems as well.

Optionally, the communication system in the embodiments of the present application may be applied to a Carrier Aggregation (CA) scenario, a Dual Connectivity (DC) scenario, or a Standalone (SA) scenario.

Various embodiments of the present application are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a STATION (ST) in a WLAN, or a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a terminal device in a next generation communication system, e.g., an NR network, or a terminal device in a future evolved Public Land Mobile Network (PLMN), etc.

In an embodiment of the present application, a terminal device may be deployed on land including indoor or outdoor, handheld, wearable or vehicle-mounted terminal device; it may be deployed on water (such as on ships, etc.); or it may be deployed aerially (such as in airplanes, balloons and satellites, etc.).

In an embodiment of the present application, the terminal device may be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

As an example rather than limitation, in an embodiment of the present application, the terminal device may also be a wearable device. The wearable device may also be referred to as a wearable intelligent device, which is a general term of wearable devices, e.g., glasses, gloves, watches, clothes, or shoes, etc., which are intelligent designed and developed on daily wear by applying wearing technology. The wearable device is a portable device that is worn directly on a body, or integrated into the clothes or accessory of a user. The wearable device is not just a hardware device, but realizes powerful functions through software support, as well as a data interaction or a cloud interaction. Generalized wearable intelligent devices include devices, e.g., a smart watch, or smart glasses, etc., that are full-featured, large sized and may realize whole or a part of functions without a smart phone, and devices, such as various smart bracelets, smart jewelry, etc. for monitoring physical signs, which specialize in a kind of application functions, and need to be cooperated with other devices, such a smart phone.

In an embodiment of the present application, the network device may be a device for communicating with a mobile device, and may be an Access Point (AP) in a WLAN, a Base Transceiver Station (BTS) in GSM or CDMA, a NodeB (NB) in WCDMA, an evolutional Node B (eNB or eNodeB) in LTE, a relay station or an access point, a vehicle device, a wearable device, a gNB in an NR network, or a network device in a future evolved PLMN network, etc.

As an example rather than limitation, in an embodiment of present application, the network device may be of mobility, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station located on land, water, etc.

In an embodiment of the present application, the network device may provide a service for a cell, and the terminal device communicates with the network device through a transmission resource (e.g., a frequency domain resource, or referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

Figure 1:
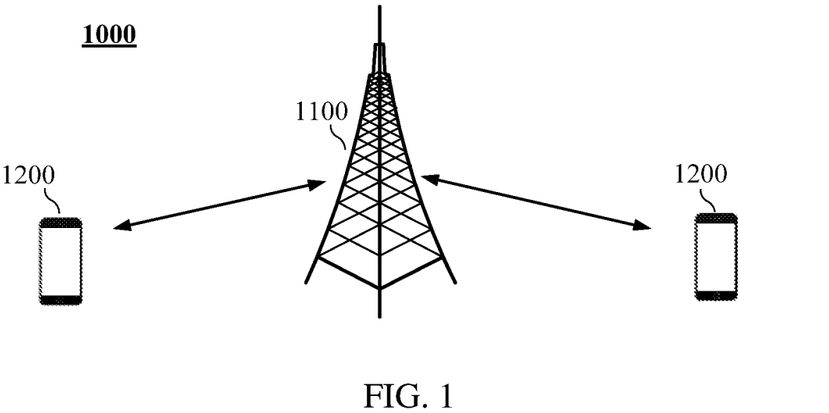
FIG. 1 is a schematic diagram of an architecture of a communication system according to an embodiment of the present application.

FIG. 1 schematically illustrates one network device 1100 and two terminal devices 1200. Optionally, the wireless communication system 1000 may include a plurality of network devices 1100, and other numbers of terminal devices may be included within a coverage area of each network device, which is not limited in the embodiments of the present application. Optionally, the wireless communication system 1000 illustrated in FIG. 1 may further include other network entities such as a Mobility Management Entity (MME), an Access and Mobility Management Function (AMF), etc., which are not limited by the embodiments of the present application.

It should be understood that the terms "system" and "network" may be used interchangeably herein often. The term "and/or" herein describes an association relationship between associated objects, for example, indicates that there may be three relationships, for example, A and/or B may indicate three cases: A alone, both A and B, and B alone. The symbol "/" herein generally indicates that objects before and after the symbol "/" are in an "or" relationship.

To clearly set forth idea of embodiments of the present application, a process of related resource configuration in the communication system is briefly described at first.

In this technology field, with respect to the Physical Uplink Control Channel configuration (PUCCH-config), the base station may configure one or more corresponding PUCCH-configs for each Bandwidth Part (BWP) of each serving cell, and a corresponding PUCCH resource will be configured in the PUCCH-config.

Specifically, when configuring the PUCCH resource, the base station may configure the PUCCH resource in a way of a PUCCH-resource set or in a way of a PUCCH resource. A corresponding PUCCH-resource set identity (PUCCH-ResourceSetId) and at least one PUCCH resource are configured for each PUCCH-resource set. For each PUCCH resource, a corresponding PUCCH resource ID (PUCCH-ResourceId) and a specific PUCCH resource are configured. The specific PUCCH resource may be configured according to a PUCCH format, and at least a length of the PUCCH resource and a offset parameter of the PUCCH resource relative to a reference point are indicated when the PUCCH format is configured.

Further, when configuring the PUCCH-config, the base station may further configure one or more sets of PUCCH spatial relation information, to configure a spatial relation between a Reference Signal (RS) and the PUCCH. Specifically, the PUCCH spatial relation information is used for configuring a spatial setting for PUCCH transmission (such as the RS used) and parameters for PUCCH power control. Each set of PUCCH spatial relation information includes PUCCH spatial relation information ID (SpatialRelationInfold). When configuring a plurality of sets of PUCCH spatial relation information, it is needed to use MAC CE to activate or indicate to use which set of PUCCH spatial relation information.

Figure 2:
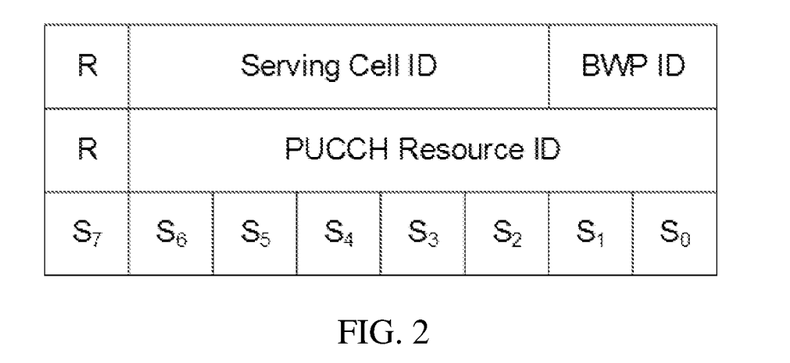
FIG. 2 is a schematic diagram of a PUCCH spatial relation activation/deactivation MAC CE format.

Therefore, FIG. 2 illustrates a PUCCH spatial relation activation/deactivation MAC CE format, which may indicate an activation status of an element in a PUCCH spatial relation information list.

Specifically, the PUCCH spatial relation activation/deactivation MAC CE format illustrated in FIG. 2 may be identified by a MAC subheader with a specific Logical Channel Identity (LCID), and the size of the MAC CE is 24 bits, including a serving cell ID field, a BWP ID field, a PUCCH Resource ID field, an $S_i$ field and an R field, with the following meanings.

The serving cell ID field indicates an identity of a serving cell corresponding to the MAC CE, and this field has a length of 5 bits.

The BWP ID field indicates an uplink BWP for which the MAC CE applies as a codepoint of a specific DCI bandwidth part indicator field, and the BWP ID field has a length of 2 bits.

The PUCCH Resource ID field contains an identity of a PUCCH Resource ID identified by a PUCCH-ResourceId, and this field has a length of 7 bits.

For the $S_i$ field, if there is one piece of PUCCH spatial relation information identified by the PUCCH spatial relation information ID and configured for the uplink BWP indicated by the BWP ID field, the $S_i$ field indicates an activation status of PUCCH spatial relation information corresponding to the PUCCH spatial relation information ID equal to i+1; otherwise, the $S_i$ field is ignored by a MAC entity. If the above-mentioned PUCCH spatial relation information exists, there are the following two cases.

If a value of the $S_i$ field is 1, it is indicated that PUCCH spatial relation information corresponding to the PUCCH spatial relation information ID equal to i+1 is activated.

If a value of the $S_i$ field is 0, it is indicated that PUCCH spatial relation information corresponding to the PUCCH spatial relation information ID equal to i+1 is deactivated.

The R field is a reserved bit, the value of which is usually set to be 0. Herein, only one piece of the PUCCH spatial relation information may be activated for the PUCCH resources by one indication.

One piece of PUCCH-config information configured by the base station for the UE at present has been described above, and the PUCCH spatial relation activation/deactivation information corresponding to the PUCCH-config may be indicated by the PUCCH spatial relation activation/deactivation MAC CE as shown in FIG. 2.

At present, with the continuous evolution of the next generation wireless communication technology, taking an IIoT system as an example, in order to support various services, it is possible for a base station to configure a plurality of pieces of PUCCH-config information for a BWP. In an actual application, one of the plurality of PUCCH-configs is used in an eMBB service, while another one is used in a URLLC service.

In this case, it is found by the inventors of the present application with a deep study that when one BWP supports or is configured with a plurality of PUCCH-configs, the PUCCH spatial relation activation/deactivation MAC CE described above cannot clearly indicate which PUCCH-config of the plurality of PUCCH-configs the activated PUCCH spatial relation belongs to, which will lead to the problem of inconsistent understanding between UE and the base station, and reduce the system performance.

Figure 3:
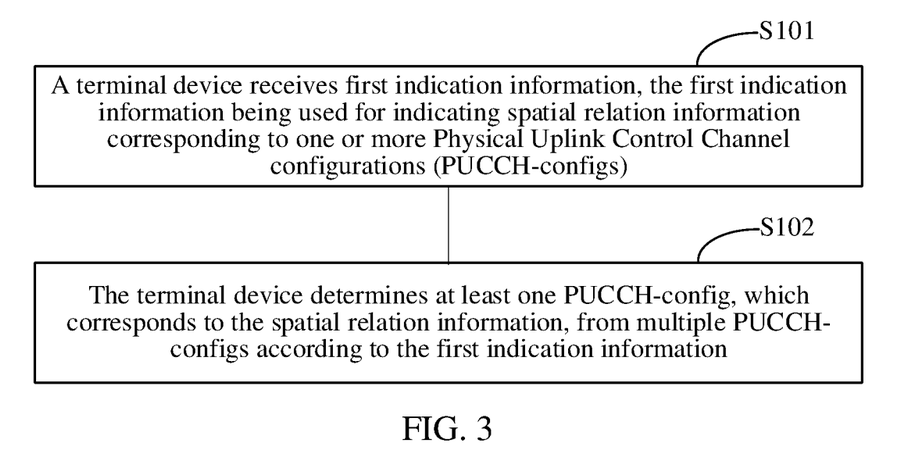
FIG. 3 is a flowchart of a resource indication method at a terminal device side according to an embodiment of the present application.

Therefore, an embodiment of the present application provides a resource indication method that is applied to a terminal device. Referring to FIG. 3, the method includes the following acts S101-S102.

In S101, a terminal device receives first indication information, wherein the first indication information is used for indicating spatial relation information corresponding to one or more Physical Uplink Control Channel configurations (PUCCH-configs).

In S102, the terminal device determines at least one PUCCH-config, which corresponds to the spatial relation information, from a plurality of PUCCH-configs according to the first indication information.

Figure 4:
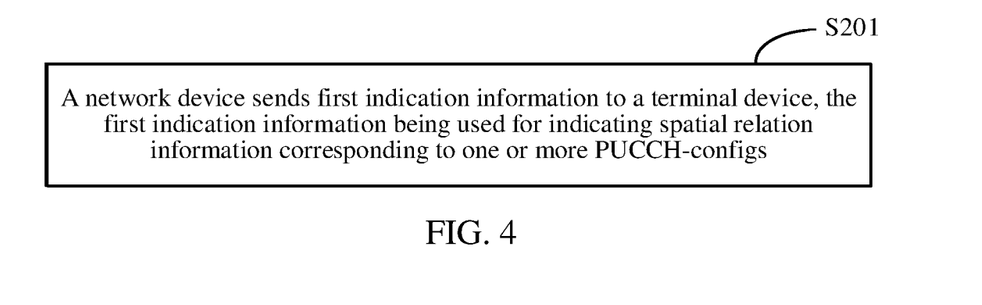
FIG. 4 is a flowchart of a resource indication method at a network device side according to an embodiment of the present application.

Correspondingly, an embodiment of the present application further provides a resource indication method that is applied to a network device. Referring to FIG. 4, the method includes: the following act S201. In S201, a network device sends first indication information to a terminal device, wherein the first indication information is used for indicating spatial relation information corresponding to one or more Physical Uplink Control Channel configurations (PUCCH-configs).

In the embodiment of the present application, spatial relation information, e.g., spatial relation activation or deactivation information, corresponding to a plurality of PUCCH-configs may be respectively indicated by the first indication information, and a PUCCH-config corresponding to an activated PUCCH spatial relation may be distinguished by the terminal device according to the first indication information, thereby avoiding the problem, in a previous indication approach, that it cannot be clearly indicated that the indicated spatial relation information corresponds to which PUCCH-config of the plurality of PUCCH-configs, and eliminating possible ambiguity between the terminal device and the network device.

In an embodiment of the present application, before first indication information is sent by the network device to the terminal device, a plurality of PUCCH-configs may be configured by the network device for the terminal device, wherein each PUCCH-config includes at least one set of spatial relation information. After receiving the plurality of PUCCH-configs configured by the network device, the terminal device may perform corresponding PUCCH resource configuration according to the plurality of PUCCH-configs.

In the following brief description, taking the network device being a base station as an example, in an embodiment of the present application, the base station may configure a plurality of sets of PUCCH resources for the UE, and send a plurality of PUCCH-configs corresponding to the plurality of sets of PUCCH resources to the UE, wherein each PUCCH-config may include at least one of the following.
① A PUCCH resource set which includes a PUCCH resource set ID and one or more PUCCH resources in the PUCCH resource set, wherein each PUCCH resource is configured with a corresponding PUCCH resource ID and a corresponding specific resource.
② A PUCCH resource which is configured with a corresponding PUCCH resource ID and a corresponding specific resource.
③ One or more sets of PUCCH-SpatialRelationInfo, wherein each set of the PUCCH-SpatialRelationInfo includes a corresponding SpatialRelationInfoId and a corresponding RS configuration, etc.

In an embodiment of the present application, after the corresponding PUCCH resource configuration is performed according to the plurality of PUCCH-configs, if first indication information is received by the terminal device, it is needed to determine one or more sets of spatial relation information indicated in the first indication information respectively correspond to which PUCCH-config of the plurality of PUCCH-configs.

Therefore, in an embodiment of the present application, the first indication information includes a first MAC CE, and the first MAC CE carries one or more sets of spatial relation information respectively corresponding to one or more pieces of PUCCH information. Therefore, the first MAC CE may indicate the spatial relation information corresponding to at least one PUCCH-config of the plurality of PUCCH-configs configured at the terminal device, in other words, the first MAC CE may indicate first spatial relation information corresponding to a first PUCCH-config of the plurality of PUCCH-configs, and/or second spatial relation information corresponding to a second PUCCH-config, and/or third spatial relation information corresponding to a third PUCCH-config, and so on.

In various embodiments of the present application, various MAC CE formats are designed to carry the above-mentioned indication information. In some embodiments, the MAC CE used conforms to a first type of PUCCH spatial relation activation/deactivation MAC CE format; and in other embodiments, the MAC CE used conforms to a second type of PUCCH spatial relation activation/deactivation MAC CE format.

According to various MAC CE formats, the terminal device uses different parsing ways to parse the MAC CEs. Generally, PUCCH-config or codebook corresponding to an activated/deactivated spatial relation may be implicitly or explicitly indicated in the MAC CE.

The MAC CE and carried resource indication information according to an embodiment of the present application will be described in detail below through several specific embodiments and the accompanying drawings.

I. First Type of PUCCH Spatial Relation Activation/Deactivation MAC CE Format: Explicit Indication FIG. 5 schematically illustrates a MAC CE format according to an embodiment of the present application, which contains a plurality of sets of PUCCH spatial relation information (in an S line) corresponding to a plurality of pieces of PUCCH information (identified as a plurality of $P_i$s) respectively, and a plurality of PUCCH resource identities corresponding to the plurality of pieces of PUCCH information respectively.

The MAC CE format used in this embodiment belongs to an improved PUCCH spatial relation activation/deactivation MAC CE format. The MAC CE indicates the PUCCH spatial relation information in the S line, and also uses the P field, identified as $P_i$ in FIG. 5, to indicate a plurality of pieces of PUCCH information. Compared with a reserved R bit in a conventional MAC CE format, the R bit in the MAC CE format in this embodiment is replaced by a new P field, and different $P_i$ values in the P field may indicate different PUCCH information.

Specifically, in this embodiment, the MAC CE includes a PUCCH config index/id of each PUCCH-config and spatial relation activation or deactivation information corresponding to each PUCCH-config. That is, the PUCCH information refers to the PUCCH config index/id, wherein different PUCCH config indexes/ids correspond to different PUCCH-configs. Herein, if the correspondence between PUCCH config index/id and spatial relation information can be determined, the correspondence between PUCCH-config and the spatial relation information can be determined.

Figure 5:
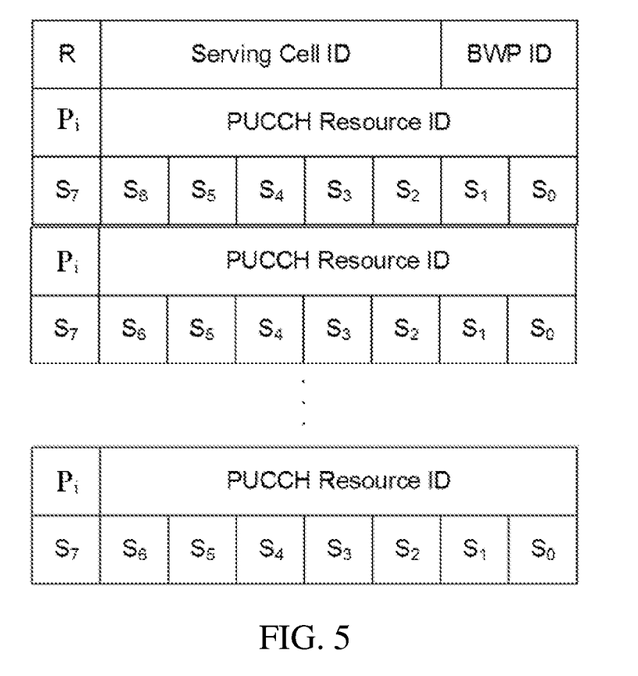
FIG. 5 is a schematic diagram of PUCCH spatial relation activation/deactivation MAC CE formats according to embodiments of the present application.

More specifically, referring to FIG. 5, different $P_i$ values indicate different PUCCH config indexes/ids. For example, if the value of $P_i$ is 0, the PUCCH-config with PUCCH config index/id of 0 (or another numerical value, such as 1) is indicated, and the spatial relation information corresponding to the PUCCH-config is the S line immediately adjacent to the $P_i$ of which the value is 0.

As another example, if the value of $P_1$ is 1, the PUCCH-config with PUCCH config index/id of 1 (or another numerical value, such as 2) is indicated, and the spatial relation information corresponding to the PUCCH-config is the S line immediately adjacent to the $P_1$ of which the value is 1.

If the value of the $S_i$ in the S line is 1, it is indicated that the PUCCH spatial relation information with the PUCCH spatial relation information ID equal to i+1 is activated; if the value of the $S_i$ field is 0, it is indicated that the PUCCH spatial relation information with the PUCCH spatial relation information ID equal to i+1 is deactivated.

In the above way, the MAC CE in this embodiment uses a specified bit (e.g., the P bit) to indicate the first PUCCH config index, and uses the specified line (e.g., the S line) immediately adjacent to the specified bit to indicate the spatial relation activation/deactivation information of the PUCCH-config corresponding to the first PUCCH config index.

The MAC CE format in the embodiment of FIG. 5 may be considered as an explicit indication, in which the MAC CE identifies various PUCCH config indexes/ids (corresponding to a plurality of PUCCH-configs) by using the P field, and indicates the activated or deactivated PUCCH spatial relation information and PUCCH Resource ID information. The value of the P field may be a preset value (e.g., 0, 1, 2, 3, 4, 5, 6 or 7), or other values that may distinguish and identify PUCCH-configs, and the value of $S_i$ in the corresponding S line may be 0 or 1.

In this embodiment, the length of the MAC CE is related to the number of PUCCH-configs. For example, the length of the MAC CE may be related to the number of PUCCH-configs configured by a terminal, or it may be related to the number of simultaneously activated PUCCH-configs.

In some embodiments, if the number of related PUCCH-configs is determined, the length of the MAC CE may be determined. In some embodiments, the length of MAC CE is constant.

In this embodiment, each P bit represents the PUCCH config id/index of a PUCCH-config. Since the explicit indication is adopted, values of P bits and the corresponding PUCCH spatial relation information are completely carried, there is no special requirement on the placement order of each set of PUCCH spatial relation information, which may be placed randomly or in a certain order. The order that may be taken is, for example, the size order of a plurality of PUCCH config indexes/ids, such as an ascending or descending order.

Furthermore, in the process of indicating different PUCCH-configs, since the Serving Cells and/or BWPs corresponding to different PUCCH-configs may be the same or different, they may be also indicated by the MAC CE.

Specifically, if the Serving Cells and BWPs corresponding to different PUCCH-configs are the same, the serving cell ID and BWP ID may be placed in corresponding fields before a first P field as illustrated in FIG. 5; if at least one of corresponding serving cell and the BWP between different PUCCH-configs is different, the corresponding fields may be added before the corresponding P field to place the corresponding serving cell ID and BWP ID, so that the indication information is full.

According to the above embodiments of the present application, based on the improved PUCCH spatial relation activation/deactivation MAC CE format, direct or indirect indication of the PUCCH-config can be realized with the redefined P bit, while the corresponding PUCCH spatial relation activation/deactivation information is indicated by an S line immediately adjacent to the P bit, and the new MAC CE format can carry accurate and full resource indication information.

II. First Type of PUCCH Spatial Relation Activation/Deactivation MAC CE Format: Implicit Indication FIG. 6 schematically illustrates another MAC CE format according to an embodiment of the present application, which includes a plurality of sets of PUCCH spatial relation information (located in the S line) and a plurality of corresponding PUCCH Resource IDs.

Figure 6:
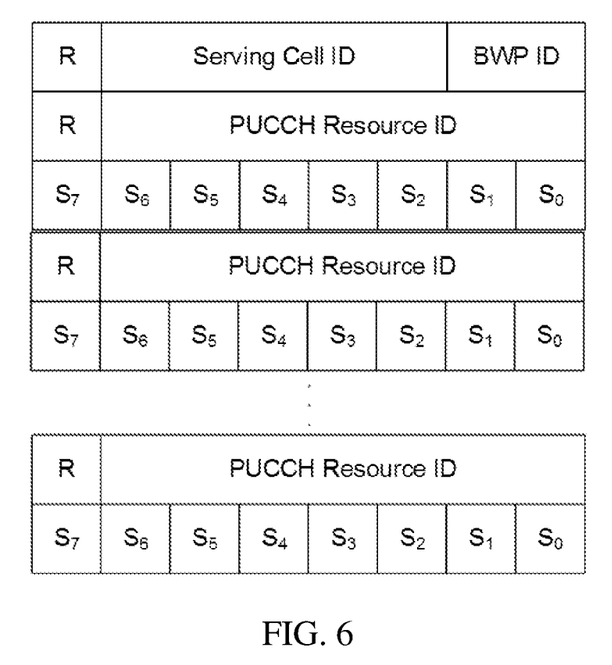
FIG. 6 is a schematic diagram of PUCCH spatial relation activation/deactivation MAC CE formats according to embodiments of the present application.

The MAC CE format according to the embodiment of FIG. 6 also belongs to an improved PUCCH spatial relation activation/deactivation MAC CE format. Compared with the embodiment of FIG. 5, this embodiment differs mainly in that: 1. the MAC CE format in this embodiment does not contain a P field, but still retains the original reserved bit (such as the R field), and 2. in this embodiment, the PUCCH information is not explicitly indicated, but resource indication is implemented by using an implicit indication.

Specifically, in the MAC CE format according to this embodiment, a plurality of sets of PUCCH spatial relation information are placed in a predetermined order.

In an embodiment, the predetermined order refers to an order of a plurality of PUCCH config indexes/ids corresponding to the plurality of pieces of PUCCH spatial relation information, e.g., an ascending or descending order (that is, from small to large or from large to small).

Since a plurality of sets of PUCCH spatial relation information (corresponding to a plurality of S lines) are placed in an agreed order of a plurality of PUCCH config indexes/ids, the UE can determine the corresponding PUCCH config indexes/ids by itself according to the order of the plurality of sets of PUCCH spatial relation information, and then determine the corresponding PUCCH-config. Therefore, in the case where an explicit indication is not used to indicate PUCCH information, both the base station and UE can accurately parse the indication information, and there is no ambiguity in understanding between the base station and the UE.

In this embodiment, the length of the MAC CE is related to the number of PUCCH-configs. For example, the length of the MAC CE may be related to the number of PUCCH-configs configured by a terminal, or it may be related to the number of simultaneously activated PUCCH-configs.

In some embodiments, if the number of related PUCCH-configs is determined, the length of the MAC CE may be determined. In some embodiments, the length of MAC CE is constant.

Setting of parameter information such as a plurality of PUCCH Resource IDs, a serving cell ID and a BWP ID may be done in a manner similar to that in the embodiment of FIG. 5, and will not be repeated here.

In this embodiment, based on the improved PUCCH spatial relation activation/deactivation MAC CE format, the new MAC CE format can carry accurate and full resource indication information by specifying the placement order of a plurality of sets of PUCCH spatial relation information placed in a plurality of S lines.

Figure 7:
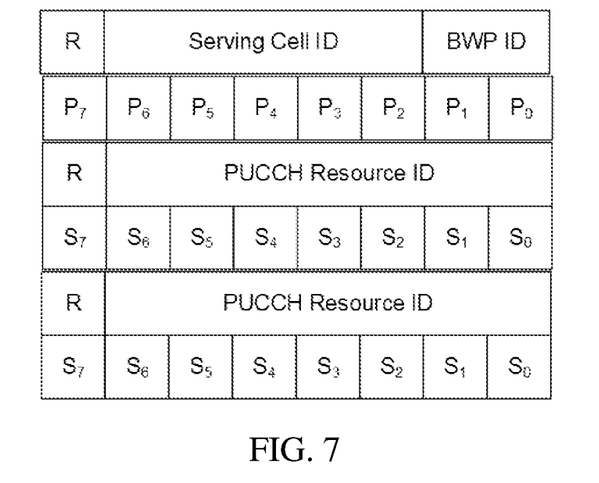
FIG. 7 is a schematic diagram of PUCCH spatial relation activation/deactivation MAC CE formats according to embodiments of the present application.

III. First Type of PUCCH Spatial Relation Activation/Deactivation MAC CE Format: Length of MAC CE is Variable.

FIG. 7 schematically illustrates yet another MAC CE format according to an embodiment of the present application, which belongs to an improved PUCCH spatial relation activation/deactivation MAC CE format. Compared with the embodiment of FIG. 5, this embodiment differs mainly in that the MAC CE format in this embodiment contains a P field, and the P field contains a plurality of bits, each of which is placed with a $P_i$ value.

In this embodiment, the MAC CE uses a plurality of bits in the specified field to indicate spatial relation activation/deactivation information corresponding to each PUCCH-config, or to indicate the presence or absence of spatial relation indication corresponding to each PUCCH-config.

Specifically, each of the plurality of bits of the specified field represents a PUCCH config index/id of each PUCCH-config respectively.

It is assumed that a first bit of the plurality of bits corresponds to a first PUCCH-config, and if a value of the first bit is a first specified value, spatial relation information of the first PUCCH-config is present in the MAC CE.

It is assumed that a second bit of the plurality of bits corresponds to a second PUCCH-config, and if a value of the second bit is a second specified value, spatial relation information of the second PUCCH-config is not present in the MAC CE.

Each bit of the plurality of bits of the specified field respectively represents a PUCCH config index/id of each PUCCH-config. The plurality of PUCCH config indexes/ids may be placed in an agreed order of the plurality of PUCCH config indexes/ids to correspond to each bit. The agreed order refers to an order of the plurality of PUCCH config indexes/ids corresponding to the plurality of pieces of PUCCH spatial relation information, such as an ascending or descending order.

Specifically, referring to FIG. 7, the MAC CE in this embodiment uses a plurality of bits in the P field to place a plurality of $P_i$ values, and $P_i$ in different positions represents different PUCCH config indexes/ids, for example, $P_5$ represents PUCCH-config with PUCCH config index/id of 5. Furthermore, the value of $P_i$ indicates whether the PUCCH spatial relation activation/deactivation information corresponding to the PUCCH-config presents in the MAC CE. For example, if a value of $P_5$ is 0, the spatial relation information of the PUCCH-config with the PUCCH config index/id of 5 does not present, and if a value of $P_5$ is 1, it presents. For another example, if the value of $P_5$ is 1, the spatial relation information of the PUCCH-config with the PUCCH config index/id of 5 does not present, and if a value of $P_5$ is 0, it presents. In case of presence, the indication mode may be a mode described in the foregoing embodiments, and the PUCCH spatial relation activation/deactivation information corresponding to the PUCCH-config may be indicated by the S line immediately adjacent to the $P_i$. Accordingly, the embodiment may be considered as an explicit indication of PUCCH information.

Accordingly, it may be configured by the base station that when the $P_1$ value corresponding to the spatial relation activation information in the MAC CE is 1, the corresponding S line presents in the MAC CE, while the $P_1$ value corresponding to the spatial relation deactivation information is 0, the corresponding S line does not present in the MAC CE. Therefore, the length of the MAC CE in this embodiment is variable and may be determined by the attribute of the indication information itself, specifically by the values of various $P_i$s.

In this embodiment, based on the improved PUCCH spatial relation activation/deactivation MAC CE format, a plurality of bits in the new P field are used to represent different PUCCH-configs, and some spatial relation information does not present, and the new MAC CE format can carry accurate and full resource indication information.

IV. First Type of PUCCH Spatial Relation Activation/Deactivation MAC CE Format: The Length of MAC CE is Constant In this embodiment a still another MAC CE format is provided, which belongs to an improved PUCCH spatial relation activation/deactivation MAC CE format. In this embodiment, the MAC CE uses a plurality of bits in the specified field to indicate spatial relation activation/deactivation information corresponding to each PUCCH-config, or whether to use the spatial relation activation/deactivation information corresponding to the PUCCH-config.

This embodiment and the embodiment of FIG. 7 are same in that the MAC CE format in this embodiment contains a P field, and the P field contains a plurality of bits, and each of the bits is provided with a $P_i$ value, but this embodiment and the embodiment of FIG. 7 are different in that the $P_i$ values have different meanings.

Specifically, each of the plurality of bits of the specified field represents a PUCCH config index/id of each PUCCH-config respectively.

It is assumed that a first bit of the plurality of bits corresponds to a first PUCCH-config, and if a value of the first bit is a first specified value, spatial relation information of the first PUCCH-config in the MAC CE is used.

It is assumed that a second bit of the plurality of bits corresponds to a second PUCCH-config, and if a value of the second bit is a second specified value, spatial relation information of the second PUCCH-config in the MAC CE is ignored.

In this embodiment, for a plurality of sets of spatial relation information in the MAC CE, the terminal may determine whether to use one or more sets of corresponding spatial relation information according to the $P_i$ value. The length of MAC CE in this embodiment does not vary with the value of $P_i$. Accordingly, the embodiment may be considered as an explicit indication of PUCCH information.

Figure 8:
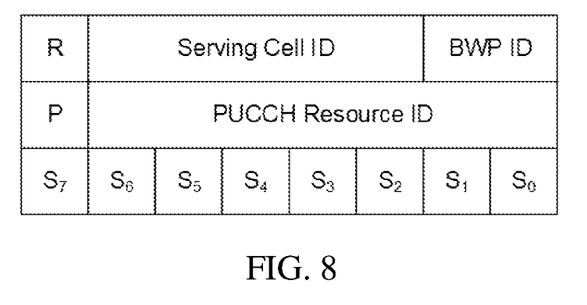
FIG. 8 is a schematic diagram of PUCCH spatial relation activation/deactivation MAC CE formats according to embodiments of the present application.

V. Second Type of PUCCH Spatial Relation Activation/Deactivation MAC CE Format: A Reserved Bit is Used FIG. 8 schematically illustrates a MAC CE format of an embodiment of the present application, which belongs to an improved PUCCH spatial relation activation/deactivation MAC CE format. Compared with the previous embodiments, the main difference of this embodiment lies in that the MAC CE in this embodiment uses a reserved bit in the original PUCCH spatial relation activation/deactivation MAC CE format to indicate the spatial relation activation/deactivation information corresponding to one PUCCH-config among a plurality of PUCCH-configs, that is, indicates the PUCCH-config information. Herein, the reserved bit may be the R bit.

In the embodiment of the present application, the reserved bit represents a PUCCH config index/id of one PUCCH-config of the plurality of PUCCH-configs, and a specified line (the S line) immediately adjacent to the reserved bit indicates spatial relation activation/deactivation information of a corresponding PUCCH-config.

For example, referring to FIG. 8, the P field indicates the PUCCH config index/id, if a value of P is 0, the PUCCH-config with the PUCCH config index/id of 0 (or other specified values) is indicated, and the S line immediately adjacent to the P field places the spatial relation activation/deactivation information corresponding to the PUCCH-config. If a value of P is 1, the PUCCH-config with PUCCH config index/id of 1 (or other specified values) is indicated, and an S line immediately adjacent to the P field places the spatial relation activation/deactivation information corresponding to the PUCCH-config. The MAC CE in this embodiment carries the spatial relation activation/deactivation information of one PUCCH-config at a time.

Multiple improved PUCCH spatial relation activation/deactivation MAC CE formats have been described in detail through multiple embodiments above, all of which can carry accurate and full resource indication information.

With regard to the logical channel identity LDID corresponding to the MAC CE, in an embodiment of the present application, a new LCID may be used, or the original LCID corresponding to the existing PUCCH spatial relation activation/deactivation MAC CE may be used, both of which can correctly receive and parse the improved PUCCH spatial relation activation/deactivation MAC CE provided in the embodiments of the present application. The two modes are described in detail respectively below.

Mode 1: Using an Original LDID (49)

Generally, a network device sends the LCID (49) to a terminal device. Correspondingly, the terminal device may detect the LCID (49) and receive and decode a MAC CE corresponding to the LCID (49).

In an embodiment of the present application, if the terminal device meets at least one of the following conditions, it is indicated that the terminal device belongs to the terminal device described in the embodiments of the present application.

a) The terminal device supports a detection capability corresponding to the new LCID.

b) The terminal device supports a detection capability of the improved MAC CE format.

c) The terminal device is indicated to perform detection based on the improved MAC CE format.

d) the terminal device is a terminal device supporting a specified protocol;

e) The terminal device supports simultaneous activations of a plurality of PUCCH-configs.

f) The terminal device is configured with a plurality of PUCCH-configs.

g) A plurality of PUCCH-configs are activated at the terminal device.

h) The terminal device supports at least one specified service, e.g., a URLLC service.

i) The terminal device supports various services, e.g., a URLLC service and an eMBB service.

Thereby, the terminal device receives and decodes the new MAC CE based on the improved MAC CE format described in the embodiments of the present application, so as to ensure to perform accurate and full parsing on the PUCCH resource indication information carried in the MAC CE.

Therefore, in the embodiment of the present application, the terminal device receives and decodes the new MAC CE based on the improved MAC CE format if the terminal device meets at least one of the above conditions a to i, even the terminal device detects the original LDID (49).

It should be noted that in other embodiments, it is still possible for a terminal device to perform decoding based on the original MAC CE format in this case.

Mode 2: Introducing a New LDID (Non-49)

For an improved MAC CE format proposed in an embodiment of the present application, a corresponding new LCID (non-49) may be used. The LCID is used for identifying the corresponding MAC CE, and in the embodiment of the present application, the new LCID is used for identifying the improved MAC CE described in any of the above embodiments. Herein, the new LCID may be a redefined LCID, which is different from the original LCID (49).

Specifically, for a terminal device that meets at least one of the conditions a to i described in the mode 1, the network device may send a new LCID to the terminal device. Accordingly, the terminal device detects the new LCID. Since the new LCID is different from the original LCID, the terminal device may make it clear that the new MAC CE should be received and decoded based on the improved MAC CE format. For example, the reserved R bit in the existing MAC CE format should be understood according to the new meaning defined in the embodiment of the present application, so as to ensure to perform accurate and full parsing on the PUCCH resource indication information carried in the MAC CE.

Based on the two modes described above, in applications, the network device may send a first LCID (e.g., the original LCID) or a second LCID (e.g., the new LCID) to the terminal device. Accordingly, the terminal device may detect the first LCID or the second LCID.

In some embodiments, the terminal device that meets at least one of the conditions a to i described in the mode 1 above, may detect the first LCID, in other words, detect according to the first LCID. For the MAC CE corresponding to the first LCID, the terminal device may receive and decode the MAC CE corresponding to the first LCID based on the improved MAC CE format described in the embodiment of the present application, so as to ensure to perform accurate and full parsing on the PUCCH resource indication information carried in the MAC CE.

In some embodiments, the terminal device that meets at least one of the conditions a to i described in the mode 1 above, may detect a second LCID, in other words, detect according to the second LCID. For the MAC CE corresponding to the second LCID, the terminal device may receive and decode the MAC CE corresponding to the second LCID according to the improved MAC CE format described in the embodiment of the present application, so as to ensure to perform accurate and full parsing on the PUCCH resource indication information carried in the MAC CE.

In another embodiment, if the terminal device detects the first LCID, it may still receive and decode the MAC CE based on an existing MAC CE format; if the terminal device detects a second LCID, it may receive and decode the MAC CE based on the improved MAC CE format according to the embodiment of the present application.

It should be noted that the terminal device according to the embodiment of the present application does not expect to receive MAC CEs of two formats or two types of LCIDs at the same time. Optionally, at different time or in different situations (for example, a plurality of PUCCH-configs are configured, but one or more PUCCH-configs may be activated at different time), the terminal device may receive one of the MAC CE formats or one of the LCIDs.

With reference to FIGS. 5-8, for the foregoing embodiments, the improved MAC CE further carries the PUCCH resource ID corresponding to one or more pieces of PUCCH information respectively. Based on this, an embodiment of the present application further provides a resource indication method, which is used for indicating a PUCCH-config corresponding to spatial relation activation/deactivation information. Specifically, the PUCCH-configs may be uniquely distinguished by configuring a different PUCCH resource ID for each PUCCH-config.

In an embodiment of the present application, when the network device configures a plurality of PUCCH-configs for the terminal device, PUCCH resource IDs configured in different PUCCH-configs are different. Thereby, when the terminal device configures a plurality of sets of PUCCH resources according to a plurality of pieces of PUCCH-config information, PUCCH resource IDs in different PUCCH-configs are also different.

When receiving the MAC CE indicating the activated PUCCH spatial relation information, the terminal device may obtain a PUCCH resource ID corresponding to the PUCCH spatial relation information that the MAC CE carries. Since the PUCCH resource ID in each PUCCH-config is different, the UE may uniquely distinguish one PUCCH-config corresponding to the activated PUCCH spatial relation according to the PUCCH resource ID.

In an embodiment of the present application, in order to uniquely determine a PUCCH-config corresponding to the PUCCH spatial relation activation information, the terminal device does not expect to receive configurations with the same PUCCH resource ID configured by different PUCCH-configs.

The specific arrangements and implementations in the embodiments of the present application have been described from different angles through multiple embodiments. The embodiment of the present application is applicable to a scene where a plurality of PUCCH-configs are used simultaneously under one BWP. If the terminal device is configured with a plurality of PUCCH-configs, one of the PUCCH-configs may be applied to, e.g., an eMBB service and one of the PUCCH-configs may be applied to, e.g., a URLLC service.

In this technology field, one PUCCH-config corresponds to one codebook. In one case, the base station may simultaneously configure at least two hybrid automatic repeat request acknowledgement (HARQ-ACK) codebooks to support different service types of UE, for example, one codebook supports a URLLC service and one codebook supports an eMBB service. In this case, the base station configures PUCCH spatial relation information and sub-slot configurations for different HARQ-ACK codebooks respectively. Thereby, when indicating the activated PUCCH spatial relation information, it also needs to indicate which codebook the activated PUCCH spatial relation information corresponds to. The embodiment of the present application may be applied to the above scenario, and the corresponding PUCCH-config is indicated by the first indication information, so that the corresponding codebook may be determined, and the problem that which codebook the activated PUCCH spatial relation information corresponds to cannot be clearly indicated can be solved.

Figure 9:
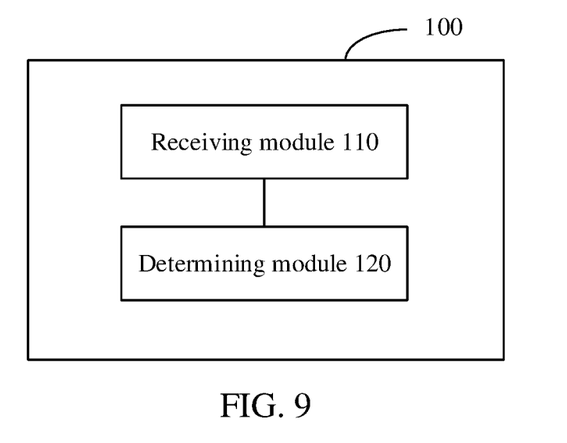
FIG. 9 is a schematic block diagram of a structure of a terminal device according to an embodiment of the present application.

Corresponding to the processing method of at least one embodiment above, an embodiment of the present application further provides a terminal device 100, referring to FIG. 9, which includes a receiving module 110 and a determining module 120.

The receiving module 110 is configured to receive first indication information, wherein the first indication information is used for indicating spatial relation information corresponding to one or more Physical Uplink Control Channel configurations (PUCCH-configs).

The determining module 120 is configured to determine at least one PUCCH-config, which corresponds to the spatial relation information, from a plurality of PUCCH-configs according to the first indication information.

Figure 10:
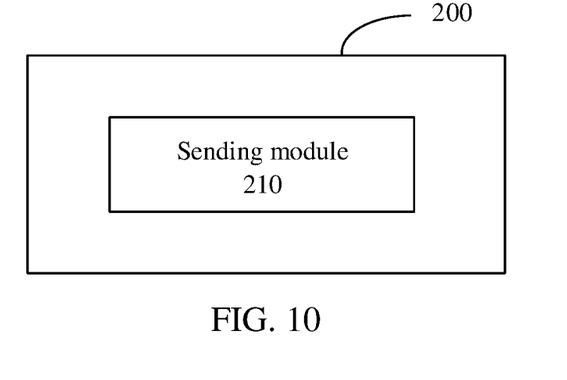
FIG. 10 is a schematic block diagram of a structure of a network device according to an embodiment of the present application.

Corresponding to the processing method of at least one embodiment above, an embodiment of the present application further provides a network device 200, referring to FIG. 10, which includes a sending module 210 configured to send first indication information to a terminal device, wherein the first indication information is used for indicating spatial relation information corresponding to one or more Physical Uplink Control Channel configurations (PUCCH-configs).

The terminal device 100 in the embodiment of the present embodiment may implement the corresponding functions and processes realized by the terminal device in any method of the embodiments of the present application. The communication device 200 in the embodiment of the present application may implement corresponding functions and processes implemented by the network device in any method of embodiments of the present application. For brevity, details are not repeated herein again.

Figure 11:
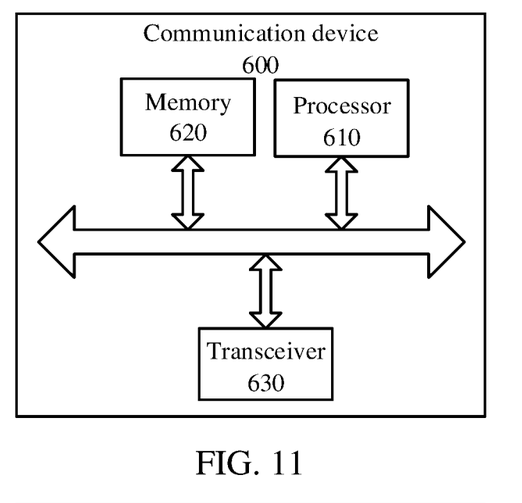
FIG. 11 is a schematic block diagram of a communication device according to an embodiment of the present application.

FIG. 11 is a schematic diagram of a structure of a communication device 600 according to an embodiment of the present application. The communication device 600 includes a processor 610, and the processor 610 may invoke and run a computer program from a memory to implement the method in the embodiment of the present application.

Optionally, the communication device 600 may further include a memory 620. The processor 610 may invoke and run a computer program from the memory 620 to implement the method in the embodiment of the present application.

Herein, the memory 620 may be a separate device independent of the processor 610, or may be integrated in the processor 610.

Optionally, the communication device 600 may further include a transceiver 630, and the processor 610 may control the transceiver 630 to communicate with another device.

Specifically, information or data may be sent to another device, or information or data sent by another device may be received.

Herein, the transceiver 630 may include a transmitter and a receiver. The transceiver 630 may further include antennas, a quantity of which may be one or more.

Optionally, the communication device 600 may be the network device according to the embodiments of the present application, and the communication device 600 may implement corresponding processes implemented by the network device in various methods in the embodiments of the present application, which will not be repeated here for brevity.

Optionally, the communication device 600 may be the terminal device according to the embodiments of the present application, and the communication device 600 may implement the corresponding processes implemented by the terminal device in various methods in the embodiments of the present application, which will not be repeated here for brevity.

Figure 12:
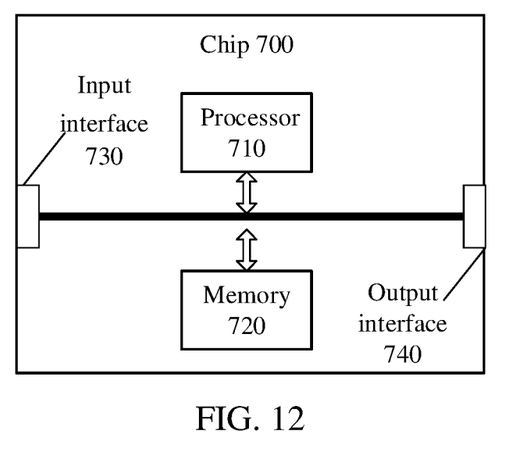
FIG. 12 is a schematic block diagram of a chip according to an embodiment of the present application.

FIG. 12 is a schematic diagram of a structure of a chip 700 according to an embodiment of the present application. The chip 700 includes a processor 710, and the processor 710 may invoke and run a computer program from a memory to implement the method in the embodiment of the present application.

Optionally, the chip 700 may further include a memory 720. The processor 710 may invoke and run a computer program from the memory 720 to implement the method in the embodiment of the present application. Herein, the memory 720 may be a separate device independent of the processor 710, or may be integrated in the processor 710.

Optionally, the chip 700 may further include an input interface 730. The processor 710 may control the input interface 730 to communicate with another device or chip. Specifically, the processor 710 may acquire information or data sent by another device or chip.

Optionally, the chip 700 may further include an output interface 740. The processor 710 may control the output interface 740 to communicate with another device or chip. Specifically, the processor 710 may output information or data to another device or chip.

Optionally, the chip may be applied to the network device in the embodiments of the present application, and the chip may implement corresponding processes implemented by the network device in the various methods in the embodiments of the present application, which will not be repeated here for brevity.

Optionally, the chip may be applied to the terminal device in the above-mentioned embodiments of the present application, and the chip may implement the corresponding processes implemented by the terminal device in various methods in the embodiments of the present application, which will not be repeated here again for brevity.

It should be understood that the chip mentioned in the embodiments of the present application may also be referred to as a system-level chip, a system chip, a chip system, or a system on chip, etc.

The processor above-mentioned may be a general purpose processor, a digital signal processor (DSP), a field programmable gate array (FPGA), an application specific integrated circuit (ASIC) or other programmable logic devices, a transistor logic device, or a discrete hardware component, etc. The general-purpose processor above-mentioned may be a microprocessor or any conventional processor, etc.

The above-mentioned memory may be a volatile memory or non-volatile memory, or may include both volatile and non-volatile memories. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM).

It should be understood that, the above-mentioned memories are examples for illustration and should not be construed as limitations. For example, the memory in the embodiments of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is, the memories in the embodiments of the present application are intended to include, but are not limited to, these and any other suitable types of memories.

Figure 13:
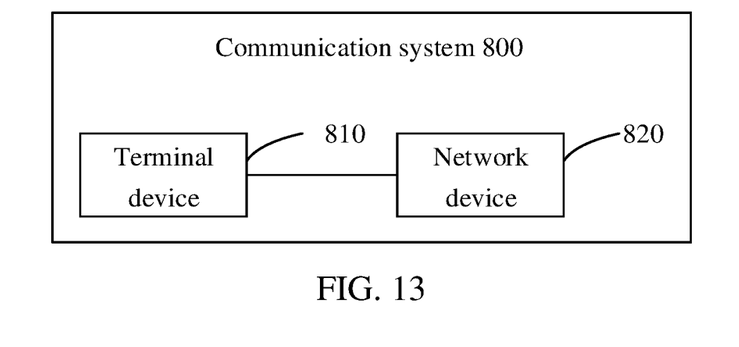
FIG. 13 is a schematic block diagram of a communication system according to an embodiment of the present application.

FIG. 13 is a schematic block diagram of a communication system 800 according to an embodiment of the present application, which includes a terminal device 810 and a network device 820.

The terminal device 810 may be configured to implement corresponding functions implemented by the terminal device in the methods in various embodiments of the present application, and the network device 820 may be configured to implement corresponding functions implemented by the network device in the methods in various embodiments of the present application. For brevity, details are not repeated herein again.

The above embodiments may be implemented in whole or in part by software, hardware, firmware, or any combination thereof. When the embodiments are implemented through software, they may be implemented in whole or in part in a form of a computer program product. The computer program product includes one or more computer instructions. When the computer program instructions are loaded and executed on a computer, the processes or functions described in the embodiments of the present application are generated in whole or in part. The computer may be a general purpose computer, a special purpose computer, a computer network, or other programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that a computer may access or a data storage device such as a server, a data center, or the like that integrates one or more available media. The available medium may be a magnetic medium (e.g., floppy disk, hard disk, magnetic tape), an optical medium (e.g., DVD), or a semiconductor medium (e.g., Solid State Disk (SSD)) or the like.

It should be understood that in various embodiments of the present application, sequence numbers of the various processes do not imply an order of execution of the various processes, which should be determined by their functions and internal logics, but should not constitute any limitation on implementation processes of the embodiments of the present application. Those skilled in the art may clearly understand that for convenience and conciseness of description, specific working processes of the systems, apparatuses, and units described above may refer to corresponding processes in the foregoing method embodiments, and details will not be repeated here. The foregoing are merely specific embodiments of the present application, but scope of protection of the present application is not limited thereto. Any person skilled in the art may readily conceive variations or substitutions within the technical scope disclosed by the present application, which should be included within the protection scope of the present application. Therefore, the scope of protection of the present application shall be subject to that of the claims.

The invention claimed is:

1. A resource indication method, applied to a terminal device, comprising:
receiving, by the terminal device, a plurality of Physical Uplink Control Channel configurations (PUCCH-configs) from a network device; configuring, by the terminal device, a plurality of sets of PUCCH resources according to the plurality of PUCCH-configs; wherein each of the plurality of pieces of PUCCH-configs comprises at least one set of spatial relation information; receiving, by a terminal device, first indication information, wherein the first indication information is used for indicating spatial relation information corresponding to the plurality of PUCCH-configs; and determining, by the terminal device, at least one PUCCH-config, which corresponds to the spatial relation information, from the plurality of PUCCH-configs according to the first indication information; wherein PUCCH resource identities (PUCCH resource IDs) configured for different PUCCH-configs in the plurality of PUCCH-configs are different; wherein, the first indication information comprises a MAC CE, wherein the MAC CE carries more sets of spatial relation information respectively corresponding to more PUCCH resource IDs; and the terminal device determines the plurality of PUCCH-configs respectively corresponding to the more sets of spatial relation information according to a PUCCH resource ID in each PUCCH-config of the plurality of PUCCH-configs and the more PUCCH resource IDs corresponding to the more sets of spatial relation information.

2. The method of claim 1, further comprising: detecting, by the terminal device, a first Logical Channel Identity (LCID) that is a specified LCID; or, detecting, by the terminal device, a second LCID that corresponds to the MAC CE, and parsing, by the terminal device, the MAC CE based on the first type of PUCCH spatial relation activation/deactivation MAC CE format or the second type of PUCCH spatial relation activation/deactivation MAC CE format.

3. A terminal device, comprising: a receiver configured to receive a plurality of Physical Uplink Control Channel configurations (PUCCH-configs) from a network device, a processor is further configured to configure a plurality of sets of PUCCH resources according to the plurality of PUCCH-configs; wherein each of the plurality of PUCCH-configs comprises at least one set of spatial relation information; the receiver is further configured to receive first indication information, wherein the first indication information is used for indicating spatial relation information corresponding to the plurality of PUCCH-configs; and the processor configured to determine at least one PUCCH-config, which corresponds to the spatial relation information, from the plurality of PUCCH-configs according to the first indication information; wherein, PUCCH resource identities (PUCCH resource IDs) configured for different PUCCH-configs in the plurality of PUCCH-configs are different; wherein, the first indication information comprises a MAC CE, wherein the MAC CE carries more sets of spatial relation information respectively corresponding to more PUCCH resource IDs; and the processor is further configured to determine the plurality of PUCCH-configs respectively corresponding to the more sets of spatial relation information according to a PUCCH resource ID in each PUCCH-config of the plurality of PUCCH-configs and the more PUCCH resource IDs corresponding to the more sets of spatial relation information.

4. The terminal device of claim 3 wherein, the processor is further configured to detect a first Logical Channel Identity (LCID) that is a specified LCID; or, detect a second LCID that corresponds to the MAC CE, and parse the MAC CE based on the first type of PUCCH spatial relation activation/deactivation MAC CE format or the second type of PUCCH spatial relation activation/deactivation MAC CE format.

* * * * *